United States Patent [19]

Shigetomi et al.

[11] Patent Number: 4,563,437

[45] Date of Patent: Jan. 7, 1986

[54] PROCESS FOR PREPARATION OF CATALYTIC COMPONENTS FOR POLYMERIZATION OF α-OLEFINS

[75] Inventors: Yoshirou Shigetomi, Fujisawa; Toshi Suzuki, Chigasaki; Katsnori Fukui, Chigasaki; Masuo Inoue, Chigasaki; Motoaki Nomura, Yokohama; Katuyoshi Miyoshi, Chigasaki, all of Japan

[73] Assignee: Toho Titanium Co., Ltd., Tokyo, Japan

[21] Appl. No.: 645,624

[22] Filed: Aug. 30, 1984

[51] Int. Cl.$^4$ ............................................. C08F 4/64
[52] U.S. Cl. .................................... 502/105; 502/112; 502/126; 526/128
[58] Field of Search ...................... 502/105, 126, 112

[56] References Cited

U.S. PATENT DOCUMENTS

| | | | |
|---|---|---|---|
| 3,923,687 | 12/1975 | Shirai et al. | 502/105 |
| 4,157,435 | 6/1979 | Toyota et al. | 502/105 X |
| 4,229,318 | 10/1980 | Mueller-Tamm et al. | 502/105 |
| 4,296,222 | 10/1981 | Staiger et al. | 502/105 X |
| 4,312,782 | 1/1982 | Mink et al. | 502/105 |

*Primary Examiner*—Patrick P. Garvin
*Attorney, Agent, or Firm*—Oblon, Fisher, Spivak, McClelland & Maier

[57] ABSTRACT

A process for preparation of a component of a catalyst for polymerization of α-olefins is disclosed. The process comprises the steps of heating a titanium containing component during and/or after milling operation thereof. The titanium-containing catalyst component thus produced makes it possible to produce polymers having a high stereoregularity in high specific yield.

11 Claims, No Drawings

PROCESS FOR PREPARATION OF CATALYTIC COMPONENTS FOR POLYMERIZATION OF α-OLEFINS

BACKGROUND OF THE INVENTION

1. Field of the Invention

This invention relates generally to a process for preparation of a component of a catalyst for polymerization of α-olefins, and more particularly to a process for preparation of a specific component of a catalyst mainly consisting of titanium trichloride used for homopolymerization or copolymerization of α-olefins.

2. Description of the Prior Art

Solid titanium trichloride and a solid composition of titanium trichloride and aluminum trichloride have been widely known in the art as a catalyst component for polymerization of α-olefins. The titanium-containing catalyst components are prepared, for example, by reducing titanium tetrachloride with metallic titanium or hydrogen, or reducing titanium tetrachloride with metallic aluminum or an organo aluminum compound. However, these components are not satisfactory in a polymerization activity per unit quantity of the catalyst component and a yield of stereoregular polymer to be produced when they are used for polymerization of α-olefins.

There have been proposed several processes for improving the titanium-containing catalyst component for the polymerization of α-olefins, such as, for example, the process for milling the solid titanium trichloride together with an electron donor such as ether or the like, the process for milling the titanium trichloride with an ester of organic acid or organic polysiloxane, and the process for milling the titanium trichloride with ether-titanium tetrachloride complex. In addition, there have been proposed chemical treatments of the catalyst component for increasing the activity and stereospecificity of the catalyst by cleansing the catalyst component with an organic solvent or the like during or after the preparation thereof.

Nevertheless, such an improvement is still insufficient to satisfy the requirements of manufacturers of α-olefins, because it is required that the catalyst component be manufactured at low cost as well as exhibiting an excellent polymerization activity per unit quantity thereof and increasing the yield of stereoregular polymer. In order to meet such requirements, it is highly desirable to develop techniques for preparing the catalyst component exhibiting excellent catalytic activity by a simplified process capable of accomplishing energy savings and eliminating cleansing with a large amount of organic solvent. In this connection, the chemical treatment of the catalyst component as described above necessarily requires cleansing with a large amount of the solvent, although it exhibits satisfactory polymerization activity and produces stereoregular polymer at high yields.

Further, the conventional high efficiency catalyst component is easily affected by a temperature and the like with the increase in performance. Thus, it is required to give full consideration to temperature by providing cooling or refrigeration facilities during the storage and transportation. This is a large burden on the user.

SUMMARY OF THE INVENTION

The present invention is intended to eliminate the above-mentioned disadvantage of the prior art.

Accordingly, it is an object of the present invention to provide a process for the preparation of a component of a catalyst mainly consisting of titanium trichloride which is capable of acting on the polymerization of α-olefin with high activity and providing stereoregular polymers at high yields.

In accordance with the present invention, there is provided a process for the preparation of a component of a catalyst for polymerization of α-olefins comprising the step of milling titanium trichloride by adding organic polysiloxane, an ester of organic acid, an ether and titanium halide having a general formula of $TiX_4$ (X: halogen) thereto. The present invention is characterized in that a heat treatment step is carried out during and/or after the milling of these materials. This eliminates cleaning the catalyst component with an organic solvent or the like during and/or after the preparation thereof. Accordingly, the process is extremely simple and it is not required to cool the catalyst component thus produced below room temperature during storage and transportation. Thus, the present invention provides the manufacturer and user of the catalyst component with much convenience.

When the catalyst component prepared according to the present invention is used for the polymerization of α-olefins, the polymerization activity per unit quantity of the catalyst component is highly increased and a stereoregular polymer is produced at significantly high yields, as compared with the conventional catalyst component. This clearly indicates that two important catalytic properties, namely, the increase in polymerization activity per unit quantity of the catalyst component and the increase in yield of stereoregular polymer can be satisfied together. Accordingly, the present invention is highly useful in industry in cooperation with simplification of the process.

DETAILED DESCRIPTION OF THE INVENTION

Titanium trichloride employed in the present invention is obtained, for example, by reducing titanium tetrachloride with hydrogen, metallic titanium, metallic aluminum or the like or reducing titanium tetrachloride with an organo alumnium compound. However, titanium trichloride may be used which is prepared by any of other suitable methods. Preferably, a composition of titanium trichloride having the formula substantially equal to $Ti_3Al_1Cl_{12}$ is used which is prepared by reducing titanium tetrachloride with metallic aluminum. Further, the composition of titanium trichloride may be modified with oxygen.

Organic polysiloxanes employed in the present invention include dimethyl polysiloxane, polymethyl hydrosiloxane, ethyl polysiloxane, methyl ethyl polysiloxane, diphenyl polysiloxane and the like. The organic polysiloxane also includes a variety of paste-like or grease-like polymers of the materials described above of which kinematic viscosity at a temperature of 20° C. is between several centistoke (cSt.) and one million centistoke.

Esters of organic acid suitable for use in the present invention include ester of aliphatic carboxylic acids such as ethyl acetate, methyl methacrylate and the like, and esters of aromatic carboxylic acids such as ethyl toluate, ethyl anisate, ethyl benzoate and the like. Preferably, an ester of an aromatic carboxylic acid is used in the present invention.

Esters employed in the present invention are organic ethers having at least one ether group in the molecule. Such organic ethers include aliphatic ethers as diethyl ether, n-propyl ether, n-butyl ether, n-amyl ether, isobutyl ether, isoamyl ether, methyl butyl ether and the like, and such cyclic ether as tetrahydrofuran, dioxane and the like. Aliphatic ether is preferably used in the present invention.

Titanium halide used in the present invention is represented by the general formula $TiX_4$ wherein X is halogen. Such titanium halide includes $TiCl_4$, $TiBr_4$, $TiI_4$ and the like. $TiCl_4$ is preferably used in the present invention.

The present invention is not limited to specific order and manner of addition of these components described above. However, some preferred orders and manners of the addition will be as follows:

(a) Titanium trichloride and organic polysiloxane are milled in advance, and then, the ester of organic acid, ether and titanium halide are separately added to the mixture of titanium trichloride and organic polysiloxane.

(b) Titanium trichloride and organic polysiloxane are milled in advance, and the ester of organic acid, ether and titanium halide are then added together thereto.

(c) Organic polysiloxane, the ester of organic acid, ether, and titanium halide are separately added to titanium trichloride.

(d) Organic polysiloxane, the ester of organic acid, ether and titanium halide are added together to titanium chloride.

(e) A reaction product of organic polysiloxane, the ester of organic acid, ether and titanium halide is added to titanium trichloride.

A period of time during which the milling treatment is carried out after the addition of the components is variable depending upon the mixed ratio of the components and the type of pulverizer used and the like. This is determined within the range of attaining the objects of the present invention. For example, when the two components are milled in advance in the manners (a) and (b) described above, the milling treatment is carried out between 10 minutes and 10 hours, preferably between 1 hour and 5 hours, and then the remaining components are added thereto and further milled together.

The milling time after the addition of the remaining components is not limited to a specific range. The milling in the manner (a) or (b) described above is generally carried out between 1 hour and 100 hours. Preferably, it is carried out between 10 hours and 50 hours. The milling time in each of (c) to (e) may be determined as in (a) and (b).

The temperature and manner of heating treatment in the present invention may be determined as desired so far as the objects of the present invention are attained. When the heating treatment is conducted during the milling operation, the temperature is determined to be generally between 30° C. and 100° C. which is in a range sufficient to prevent agglomeration of the treated product, preferably between 50° C. and 80° C., and the time of heating treatment is generally between 1 hour and 100 hours, preferably between 1 hour and 60 hours. The temperature and time of such heating treatment are also applicable to the heating temperature of the product being milled in a pulverization vessel or a separate vessel after the completion of the milling treatment.

The amount of each of the components to be used in the present invention is variable depending upon the treatment conditions such as the order of addition of the components, milling time, temperature of heating treatment and the like, and it is not limited to a specific range so far as the objects of the present invention are attained. However, in general, organic polysiloxane, ester of organic acid, ether and titanium halide are respectively used at 0.5-10 wt.%, 0.5-15 wt.%, 1-10 wt.% and 0.05-2 wt.% in amount based on titanium trichloride, preferably at 1-5 wt.%, 3-10 wt.%, 3-8 wt.% and 0.1-0.5 wt.%.

Suitable pulverizers for use in the milling treatment in the present invention include conventional pulverizers which have been used in the past for the fine pulverization of powder, such as a ball mill, a vibration mill, a tower type grinder, an impact grinder or the like.

The milling and heat treatments of the present invention described above are preferably conducted in an inert atmosphere.

In the conventional high performance catalyst component prepared by the chemical treatment described above, the activity of the catalytic component is increased by cleansing the catalyst component with an organic solvent during or after the preparation. To the contrary, the present invention, as described above, eliminates such a troublesome cleansing treatment and provides an α-olefin polymerization catalyst component which is capable of exhibiting excellent catalytic activity or a high polymerization activity per unit quantity thereof and producing stereoregular polymer with a high yield. Further, the α-olefin polymerization catalyst component according to the present invention is economically prepared because of its simplified process, and energy and resource can be significantly saved. Thus, the process of the present invention is highly useful in industry.

Olefins homopolymerized or copolymerized by using the catalyst component prepared according to the present invention include ethylene, propylene, 1-butene, 4-methyl-1-pentene and the like.

The above and other advantages of the present invention will be made clear from the following examples and comparisons, however, the present invention is not interpreted in a limited sense by the following description.

EXAMPLE 1

(Peparation of the catalyst component)

208 g of titanium trichloride subjected to modification treatment in advance with 1 mol.% of oxygen was charged into a vibration mill with a 1.0 l inner capacity wherein 12 mm$\phi$ steel balls occupied 0.8 l of the total apparent volume. The mill was fully replaced by nitrogen gas and charged with 4 g of dimethyl polysiloxane having a viscosity of 100 centistoke (cSt.), and titanium trichloride and dimethyl polysiloxane were milled for 2 hours while keeping the mill at a temperature of 30° C. Then, 14 g of ethyl benzoate, 13.5 g of diethyl ether and 0.5 g of titanium tetrachloride were admixed therewith and further milled at 30° C. for 22 hours. After the milling treatment, 100 g of the resulting product was taken out in a sample bottle in a nitrogen atmosphere and subjected to heat treatment for 48 hours in an oil bath of 50° C. A catalytic component was obtained.

(Polymerization by means of the catalyst component)

A 1.5 l autoclave was filled with argon and loaded with 0.1 g of the resulting catalytic component, 0.29 g of diethyl aluminum monochloride and 450 ml of n-heptane. The autoclave was heated to 70° C., 200 ml of hydrogen was fed and propylene was fed into the autoclave. The propylene was polymerized at a propylene pressure of 10 Kg/cm².G at 70° C. for 4 hours.

After the polymerization was stopped by adding 50 ml of butanol into the autoclave, the contents of the autoclave were stirred approximately for 10 minutes to decompose the catalyst. Then, the solid reactants were dried in vacuo to yield a solid polymer. The amount of the resulting polymer is designated as (B).

Then, the resulting solid polymer was extracted with boiling n-heptane for 6 hours to yield a heptane insoluble polymer. The amount of the heptane insoluble polymer is designated as (C).

The amount of polymer remaining in the solvent is designated as (A). The yield of the isotactic polymer (D) can thus be calculated by the formula:

$$D = C/(A+B) \times 100$$

The yield of atactic polymer can be calculated by the formula:

$$100 - D$$

The results are shown in Table 1.

EXAMPLE 2

The process of Example 1 was repeated, except that after charging all the components in the mill, the milling operation was carried out for 16 hours and the heat treatment was conducted at 70° C. for 6 hours. Polymerization by means of a catalytic component thus produced was carried out in the same manner as in Example 1. Results obtained are shown in Table 1.

EXAMPLE 3

The process of Example 1 was repeated, except that titanium trichloride which was not subjected to the modification treatment with oxygen was used. Polymerization by means of a catalytic component thus produced was carried out in the same manner as in Example 1 except that 0.103 g of the catalytic component was used. Results obtained are shown in Table 1.

EXAMPLE 4

The process of Example 1 was repeated, except that the heat treatment was conducted at 70° C. for 12 hours after the milling operation. Polymerization by means of a catalytic component thus produced was carried in the same manner as in Example 1 except that 0.103 g of the catalytic component was used. Results obtained are shown in Table 1.

EXAMPLE 5

The process of Example 2 was repeated, except that methyl methacrylate was substituted for ethyl benzoate and the heat treatment was conducted at 60° C. for 6 hours after the milling operation. Polymerization by means of a catalytic component thus produced was carried out in the same manner as in Example 1 except that 0.096 g of the catalytic component was used. Results obtained are shown in Table 1.

EXAMPLE 6

The process of Example 1 was repeated, except that a reaction product derived from the same amount of dimethyl polysiloxane, ethyl benzoate, diethyl ether and titanium tetrachloride as in Example 1 was admixed with titanium trichloride in the vibration mill and then milling treatment was conducted for 24 hours. Polymerization by means of a catalytic component thus produced is carried out in the same manner as in Example 1 except that 0.0097 g of the catalytic component was used. Results obtained are shown in Table 1.

EXAMPLE 7

The process of Example 1 was repeated, except that after conducting the milling operation for 20 hours while keeping the temperature within the vibration mill at 30° C., the milling operation was further continued for 4 hours at an elevated temperature so that the temperature within the vibration mill may reach 70° C. in four hours. Polymerization by means of a catalytic component thus produced was carried out in the same manner as in Example 1 except that 0.097 g of the catalytic component was used. Results obtained are shown in Table 1.

Comparative Example 1

The process of Example 1 was repeated, except that ethyl benzoate was not used. Polymerization by means of a catalytic component thus produced was carried out in the same manner as in Example 1 except that 0.097 g of the catalytic component was used. Results obtained are shown in Table 1.

Comparative Example 2

The process of Example 1 was repeated, except that the heat treatment was not conducted. Polymerization by means of a catalytic component thus produced was carried out in the same manner as in Example 1 except that 0.098 g of the catalytic component was used. Results obtained are shown in Table 1.

Comparative Example 3

The process of Example 1 was repeated, except that diethyl ether was not used. Polymerization by means of a catalytic component thus produced is carried out in the same manner as in Example 1 except that 0.094 g of the catalytic component was used. Results obtained are shown in Table 1.

Obviously many modifications and variations of the present invention are possible in the light of the above teachings. It is therefore to be understood that within the scope of the appended claims the invention may be practiced otherwise than as specifically described.

TABLE 1

| | Examples | | | | | | | Comparisons | | |
|---|---|---|---|---|---|---|---|---|---|---|
| | 1 | 2 | 3 | 4 | 5 | 6 | 7 | 1 | 2 | 3 |
| Amount (A)g of Polymer Remaining in Polymerization Solvent | 2.74 | 3.13 | 2.36 | 2.97 | 1.66 | 1.72 | 1.16 | 4.92 | 5.46 | 2.87 |
| Amount (B)g of | 346.56 | 298.98 | 322.60 | 334.14 | 293.50 | 294.50 | 279.06 | 209.33 | 183.14 | 128.83 |

TABLE 1-continued

| | Examples | | | | | | | Comparisons | | |
|---|---|---|---|---|---|---|---|---|---|---|
| | 1 | 2 | 3 | 4 | 5 | 6 | 7 | 1 | 2 | 3 |
| Solid Polymer Amount (C)g of Boiling Heptane-Insoluble Polymer | 341.71 | 294.46 | 318.41 | 329.46 | 290.27 | 291.18 | 275.46 | 202.84 | 174.35 | 127.93 |
| Polymerization* Activity | 873.25 | 755.18 | 788.74 | 826.25 | 768.65 | 763.45 | 722.22 | 552.19 | 481.12 | 350.27 |
| Yield (D)% of ** Isotactic Polymer | 97.8 | 97.5 | 98.0 | 97.7 | 98.3 | 98.3 | 98.3 | 94.7 | 92.4 | 97.1 |
| Yield % of Atactic Polymer 100-(D) | 2.2 | 2.5 | 2.0 | 2.3 | 1.7 | 1.7 | 1.7 | 5.3 | 7.6 | 2.9 |

*Polymerization activity = polymer (g)/catalyst (g) × hour
**Yield of crystalline polymer (D)% = (C)/(A) + (B) × 100

What is claimed as new and desired to be secured by Letters Patent of the United States is:

1. A process for preparation of a component of a catalyst for polymerization of α-olefins comprising the steps of:

milling (a) titanium trichloride or a composition of titanium trichloride and a metal halide with (b) 0.5–10 wt.% of organic polysiloxane, (c) 0.5–15 wt.% of an ester of carboxylic acid, (d) 1–10 wt.% of ether and (e) 0.05–2 wt.% of titanium halide represented by the formula $TiX_4$ (X: halogen) based on said component (a), thereby to obtain a titanium-containing component; and subjecting said titanium-containing component to heating treatment at a temperature between 30° C. and 100° C. for 1–100 hours during and/or after said milling operation.

2. The process as defined in claim 1, wherein said composition of titanium trichloride and the metal halide is a solid chloride having the formula substantially equal to $Ti_3Al_1Cl_{12}$.

3. The process as defined in claim 1, wherein said titanium trichloride or said composition of titanium trichloride and the metal halide is modified by oxygen.

4. The process as defined in claim 1, wherein organic polysiloxane is selected from the group consisting of dimethyl polysiloxane, polymethyl hydrosiloxane, ethyl polysiloxane, methyl-ethyl polysiloxane and diphenyl polysiloxane.

5. The process as defined in claim 1, wherein said ester is an ester of an aliphatic carboxylic acid selected from the group consisting of ethyl acetate and methyl methacrylate.

6. The process as defined in claim 1, wherein said ester is an ester of an aromatic carboxylic acid selected from the group consisting of ethyl toluate, ethyl anisate and ethyl benzoate.

7. The process as defined in claim 1, wherein said ether is aliphatic ether selected from the group consisting of diethyl ether, n-propyl ether, n-butyl ether, n-amyl ether, isobutyl ether, isoamyl ether and methyl butyl ether.

8. The process as defined in claim 1, wherein said ether is a cyclic ether selected from the group consisting of tetrahydrofuran and dioxane.

9. The process as defined in claim 1, wherein said titanium halide is selected from the group consisting of $TiCl_4$, $TiBr_4$ and $TiI_4$.

10. The process as defined in claim 1, wherein the temperature of said heat treatment ranges from 50° C. to 80° C.

11. The process as defined in claim 1, wherein the amounts of said components (b), (c), (d) and (e) in said milling step are 1–5 wt.%, 3–10 wt.%, 3–8 wt.% and 0.1–0.5 wt.%, respectively.

* * * * *